United States Patent Office 2,757,168
Patented July 31, 1956

2,757,168
ACID RESISTING SILICATE CEMENTS CONTAINING THERMOPLASTIC RESIN

Francis Robert Himsworth and Harry Hughes, Norton-on-Tees, England, assignors to Imperial Chemical Industries Limited, a corporation of Great Britain No Drawing. Application March 17, 1952,
Serial No. 277,059

Claims priority, application Great Britain May 11, 1951

5 Claims. (Cl. 260—41)

This invention relates to acid-resisting cements and concretes of the types which comprise an inert aggregate and a binder consisting of a water-soluble silicate to which mixture a substance such as sodium silicofluoride or ethyl acetate is preferably added to accelerate the setting of the mixture.

Conventional cements of this type are known to be rapidly attacked by alkaline liquors and slowly by water itself, and it is an object of the present invention to render cements of the type referred to substantially alkali-resistant.

It is another object of the invention to produce a cement of the type referred to in which a sodium silicofluoride setting accelerator is used and the joints of which with brickwork, stonework or the like are not subject to the destructive action of a mineral acid of medium or high concentration of which 77% sulphuric acid is typical, and which acid, while not affecting the cement itself, affects the bond between this cement and the stonework, brickwork or the like.

Other objects will appear as the specification proceeds.

According to the invention, a process of treating a cement or concrete of the kind referred to comprises heating the cement or concrete, when in position, to a temperature of the order of 100° C. or more, preferably to about 125° C.

In cements which do not contain a setting accelerator, it is well-known practice to apply heat to cause the cement to set. The temperatures to which such cements are heated for this purpose are, however, considerably below those to be applied according to the present invention; temperatures which have been used have normally been of the order of 50° C.

It is preferred to apply the heating according to this invention after the cement has set, i. e., dry heat, setting having been achieved either by the application of the conventional more moderate temperature or in the cold by the action of a chemical setting accelerator.

The treatment according to the invention has been found to result in the stated objects of the invention being attained very satisfactorily, the cement becoming substantially resistant to cold caustic soda up to 20% concentration and, even when it is caused to set with the aid of sodium silicofluoride, forming joints with brickware or stoneware in which the bond is unattacked by 77% sulphuric acid.

The following is a record of experiments carried out with a cement of the type referred to in which the hardening agent was ethyl acetate and which was dry heated overnight at the temperatures mentioned below, i. e., after having been allowed to set at room temperature for one day:

| Temperature °C | Resistance to cold caustic soda solution after heating |
| --- | --- |
| 50 | Rapidly destroyed by 2% NaOH. |
| 80 | Soft after 18 days in 2% NaOH. |
| 100 | Fairly hard after 21 days in 2% NaOH. Very soft after 21 days in 5% NaOH. |
| 105 | Unattacked after 6 days in 2% NaOH. Slightly softened after 6 days in 5% NaOH. |
| 125 | Little effect after 28 days in 10% and 20% NaOH. |
| 280 | Unaffected after 28 days in 30% NaOH. |

It is seen that the effect of heating on the alkali resistance of the cement increases with heating temperature, the effect becomes technically particularly attractive when heating is carried out at temperatures of or above 105° C.

The method by which heating according to the invention is carried out depends on the structure in which the cement is used. In many cases a hot air blower may with advantage be employed for the purpose. When the cement is used for the construction of tiled or bricked floors, it may be heated by means of platens or the like.

A disadvantage of conventional cements and concretes of the types which comprise an inert aggregate and a binder consisting of water-soluble silicate such as sodium silicate, i. e., water glass is that they are porous and permeable to liquids. This is accentuated if for any reason they are exposed to dry heat treatment. A further feature of the present invention is to overcome this disadvantage.

According to this further feature of the invention, a cement or concrete of the type referred to has incorporated therein a thermoplastic material, preferably in finely divided form. The cement or concrete is then put in position and heated according to the principal feature of the invention.

We have found that by this means the cement or concrete can be made water-impermeable or even water-repellent.

A thermoplastic material which has been found very suitable for the purpose of this feature of the invention is that sold under the registered trade name "Alkathene" which is the thermoplastic material, polyethylene, that is, an ethylene polymer. It has the advantage of good chemical resistance. Other thermoplastic materials, such as polyvinyl chloride, may, however, be used. The material sold under the registered trade name "Fluon" which is a thermoplastic poly tetra fluoro ethylene, may be used, although it will require a considerably higher temperature in the treatment than does "Alkathene," viz., a temperature of about 350° C. or, preferably, more.

When "Alkathene" is used, a percentage by weight of more than 5% of dry material, referred to the original cement mixture, should be added to this mixture, and for best results about 20%. The cement without an addition according to the further feature referred to of this invention rapidly absorbs water by capillary action. As "Alkathene" is added in increasing amounts, water absorption becomes slower. The improvement is noticeable at 5% of dry material by weight, referred to the weight of the cement mixture before the addition according to this feature of the invention, considerable at 10%, while with 20% the surface is definitely water-repellent, a globule remaining on the surface indefinitely without wetting it. The cement becomes water impermeable on addition of 5% or more of dry "Alkathene" and curing at 125° C., as was proved by testing such cements under heads of up to 3 feet of water.

A wide range of temperatures from 100° C. upwards may be used depending on the thermoplastic material added. A useful temperature for the heat treatment of the cement or concrete with "Alkathene" added was found to be of the order of 125° C., i. e. of the same order as the temperature stated hereinbefore to be preferred for the purpose of conferring substantial alkali-resistance to the cement or concrete.

A further effect obtained by the treatment according to the further feature referred to of this invention is that adhesion of the cement or concrete to ceramics such as acid-resisting brick is notably improved. Without addition according to this feature, a cement of the type under consideration gives a fracture partly in the cement and partly at the brick/cement interface. With "Alkathene" additions of more than about 2% the joint strength increases markedly, and fracture occurs in the cement rather than at the interface.

While it is preferred to add the thermoplastic material as a dry powder, it may, alternatively, be added in the form of a latex, to wit, a dispersion in a liquid medium, e. g., water, provided this is sufficiently concentrated. If the latex is not sufficiently concentrated, its effect is not pronounced enough to make its addition technically attractive.

We claim:

1. A process for rendering alkali-resistant, and acid-resistant cement comprising an inert aggregate, an alkali metal silicate binder and a substance which accelerates the setting of the cement which comprises the steps of incorporating in the cement a thermoplastic material selected from the group consisting of polyethylene and polymerised halogen substituted hydrocarbons and then subjecting the cement, when placed in the position in which it is to be used, to dry heat at a temperature sufficient to melt the thermoplastic material, and of at least 100° C.

2. A process as claimed in claim 1 in which the substance which accelerates the setting of the cement is sodium silicofluoride.

3. A process as claimed in claim 1 in which the substance which accelerates the setting of the cement is ethyl acetate.

4. A process as claimed in claim 1 in which the thermoplastic material is polyvinyl chloride.

5. A process for rendering alkali-resistant, an acid-resistant cement comprising an inert aggregate, an alkali metal silicate binder and ethyl acetate as a setting accelerator which comprises the steps of incorporating polyethylene in the cement and then subjecting the cement, when placed in the position in which it is to be used, to dry heat at a temperature of about 125° C.

References Cited in the file of this patent

UNITED STATES PATENTS

| | | |
|---|---|---|
| 1,299,798 | Skinner | Apr. 8, 1919 |
| 2,234,646 | Humphries | Mar. 11, 1941 |
| 2,419,080 | Kraus | Apr. 15, 1947 |
| 2,514,637 | Goldstein | July 11, 1950 |

FOREIGN PATENTS

| | | |
|---|---|---|
| 606,119 | Great Britain | 1948 |

OTHER REFERENCES

Farmer: Plastics XV, April 1950, page 89.